(12) United States Patent
Manners (10) Patent No.: US 9,897,241 B2
(45) Date of Patent: Feb. 20, 2018

(54) LINER ASSEMBLY FOR PIPELINE REPAIR OR REINFORCEMENT AND METHOD OF INSTALLING THE SAME

(71) Applicant: Nu Flow Technologies 2000 Inc., Oshawa (CA)

(72) Inventor: Cameron Manners, Oshawa (CA)

(73) Assignee: NU FLOW TECHNOLOGIES 2000 INC., Oshawa, Ontario (CA)

( * ) Notice: Subject to any disclaimer, the term of this patent is extended or adjusted under 35 U.S.C. 154(b) by 136 days.

(21) Appl. No.: 14/398,499

(22) PCT Filed: May 2, 2013

(86) PCT No.: PCT/CA2013/000428
§ 371 (c)(1),
(2) Date: Nov. 3, 2014

(87) PCT Pub. No.: WO2013/163736
PCT Pub. Date: Nov. 7, 2013

(65) Prior Publication Data
US 2015/0107713 A1    Apr. 23, 2015

Related U.S. Application Data

(60) Provisional application No. 61/641,517, filed on May 2, 2012.

(51) Int. Cl.
*F16L 55/10* (2006.01)
*F16L 55/163* (2006.01)
(Continued)

(52) U.S. Cl.
CPC ............ *F16L 55/163* (2013.01); *B29C 63/28* (2013.01); *F16L 55/10* (2013.01); *F16L 55/1654* (2013.01); *F16L 55/179* (2013.01); *F16L 55/18* (2013.01)

(58) Field of Classification Search
USPC ................... 138/97, 98; 405/150.1, 184.2
See application file for complete search history.

(56) References Cited

U.S. PATENT DOCUMENTS

1,760,750 A * 5/1930 Goodman ................. F16K 7/10
138/93
4,366,012 A   12/1982 Wood
(Continued)

FOREIGN PATENT DOCUMENTS

CA    2 462 853    4/2003
CA    2 505 939    11/2006
(Continued)

OTHER PUBLICATIONS

International Search Report and Written Opinion dated Aug. 29, 2013 in corresponding International Application No. PCT/CA2013/000428.

*Primary Examiner* — James Hook
(74) *Attorney, Agent, or Firm* — Faegre Baker Daniels LLP (57) ABSTRACT

A liner assembly for a pipeline section having at least one junction with a lateral pipe, the liner assembly comprises an outer tubular liner having an opening therein generally coinciding in position with each junction when the liner assembly is positioned with the pipeline section and an inner malleable inflatable bladder assembly positioned longitudinally within the tubular liner, said bladder assembly being inhibited from over-expanding during positioning and inflation of the liner assembly within the pipeline section.

20 Claims, 7 Drawing Sheets

(51) Int. Cl.
  *F16L 55/165* (2006.01)
  *F16L 55/179* (2006.01)
  *F16L 55/18* (2006.01)
  *B29C 63/28* (2006.01)

(56) References Cited

U.S. PATENT DOCUMENTS

| | | | | |
|---|---|---|---|---|
| 4,995,761 A * | 2/1991 | Barton | ............. | F16L 55/26 138/93 |
| 5,379,802 A * | 1/1995 | VanderLans | ......... | F16L 55/128 138/89 |
| 5,388,616 A * | 2/1995 | Muller | ............. | F16L 55/179 138/104 |
| 5,628,345 A * | 5/1997 | Fisco | ............. | F16L 55/163 138/97 |
| 5,706,861 A * | 1/1998 | Wood | ............. | F16L 55/163 138/97 |
| 5,794,663 A * | 8/1998 | Kiest, Jr. | ............. | B29C 63/36 138/97 |
| 6,039,079 A * | 3/2000 | Kiest, Jr. | ............. | B29C 63/36 138/97 |
| 6,068,725 A * | 5/2000 | Tweedie | ............. | F16L 55/179 138/97 |
| 7,052,567 B1 * | 5/2006 | Blackmore | ............. | B29C 35/0272 138/98 |
| 8,869,839 B1 * | 10/2014 | D'Hulster | ............. | F16L 55/1651 138/97 |
| 2002/0083990 A1 * | 7/2002 | Lundman | ............. | F16L 55/1645 138/98 |
| 2006/0243337 A1 * | 11/2006 | Manners | ............. | F16L 55/1654 138/98 |
| 2011/0100498 A1 | 5/2011 | Manners | | |

FOREIGN PATENT DOCUMENTS

| | | |
|---|---|---|
| EP | 1 719 946 | 11/2006 |
| EP | 1 783 417 | 5/2007 |
| WO | 2012/016247 | 2/2012 |
| WO | 2012/016324 | 2/2012 |

\* cited by examiner

LINER ASSEMBLY FOR PIPELINE REPAIR OR REINFORCEMENT AND METHOD OF INSTALLING THE SAME

CROSS-REFERENCE TO RELATED APPLICATION

The present application is a National Stage of International Application No. PCT/CA2013/000428, filed May 2, 2013, which claims priority to U.S. Provisional Patent Application No. 61/641,517, filed May 2, 2012, the entire disclosures of which are hereby expressly incorporated herein by reference.

FIELD OF THE INVENTION

The present invention generally relates to pipeline repair and/or reinforcement and in particular, to a liner assembly for pipeline repair or reinforcement and to a method of installing the same.

BACKGROUND OF THE INVENTION

Liners are commonly used to repair and/or reinforce ruptured or weak areas in pipeline networks such as sewer systems and the like. Conventional approaches for installing a liner into a pipeline typically involve excavation to expose the pipeline. However, as will be appreciated, excavation methods are expensive, time consuming and disruptive.

To avoid the problems associated with excavation, "cure-in-place" pipeline repair technology has been developed to allow pipelines to be repaired or reinforced without requiring disruptive excavation. During "cure-in-place" pipeline repair or reinforcement, a resin impregnated liner is delivered to the pipeline section to be repaired or reinforced, is brought into contact with the interior surface of the pipeline section and is maintained in place at that location until the curing process is complete.

Several approaches for positioning "cure-in-place" liners within a pipeline are used in the industry. For example, the liner can be pushed along the pipeline to a desired location using a series of push-rods. As will be appreciated, transitional areas along the pipeline such as bends and fittings create significant delivery problems, as the push-rods may be unable to effectively move beyond these transitional areas.

Alternatively, and more commonly used in the industry, the liner may be pulled along the pipeline to a desired location using a winch and cable. For example, U.S. Pat. No. 6,691,741 to Manners discloses an installation assembly for installing a liner in a pipeline comprising an inner bladder having an installation end and a retrieval end. An outer bladder surrounds the inner bladder. The ends of the inner and outer bladders are coupled together adjacent the installation end. The inner bladder is coupled to an air source at the retrieval end and the outer bladder adjacent the retrieval end is free. Following installation and curing of the liner, the bladder assembly is retrieved by pulling on the retrieval end of the inner bladder, and upon retrieval, the outer bladder is inverted.

Inversion delivery, wherein a liner is unrolled through itself by applied pressure as it projects forwardly into a pipeline, has also been described. For example, U.S. Pat. No. 4,366,012 to Wood discloses a method of impregnating the inner absorbent layer of a long flexible tube with a curable resin. During the method, a mass of the resin is introduced into one end of the tube. A window is formed in the impermeable outer layer of the tube at a distance from the resin mass. A vacuum in the interior of the tube is drawn through the window and concurrently the resin mass is pushed toward the evacuated region by passing the tube between a pair of squeezing members. When the flowing resin reaches the vicinity of the window, the window is sealed. Another window is formed in the tube farther downstream of the previously formed window. A vacuum is drawn through the new window while the squeezing members force the resin to flow toward the newly evacuated region. The procedure is repeated until the resin has spread through the entire inner absorbent layer of the tube.

The installation of "cure-in-place" liners in pipelines presents certain challenges. For both push-in and pull-in delivery methods, excessive friction during positioning of the liner imparts longitudinal stresses on the liner, often resulting in stretching of the liner. This stretching is undesirable as it may result in weak sections of the liner used to repair or reinforce the pipeline section, which can result in future failure of the repaired or reinforced pipeline section. In the case of inversion delivery, liner rupture can occur due to the considerable pressures used to unroll the liner. Such liner rupture is more prevalent for installation of longer liners due to the greater pressures required.

Pipelines having bends (i.e. 22°, 45°, 90°) and/or other fittings (i.e. Y- and T-junctions) present additional challenges. As practitioners in the industry are aware, liners delivered by prior art installation systems are generally prone to creasing in these areas of transition. Creases disrupt fluid flow and may initiate an obstruction in the pipeline. Proper installation of the liners requires the liners to be smoothly and evenly urged into contact against the inner surface of the pipeline section being repaired or reinforced. Conventional PVC/vinyl inflatable bladders used in prior art installation systems to urge liners into contact with the inner surface of the pipeline section in transitional areas have been found to be deficient due to the nonmalleable nature of these inflatable bladders. As a result, these inflatable bladders often introduce folds and/or creases into the liners in these transitional areas.

Additionally, when sections of pipeline having junctions with lateral pipes are lined using prior art methods, the liners may cover the junctions and obstruct the openings to the lateral pipes. As a result, when this occurs in a pipeline section, the portion of the liner obstructing the opening needs to be removed in situ using a cutting tool fed through the lateral pipe. Such in situ cutting is generally tedious, and adds to the cost of pipeline repair or reinforcement.

As will be appreciated, improvements are desired. It is therefore an object of the present invention to provide a novel liner assembly for pipeline repair or reinforcement and a novel method of installing the same.

SUMMARY OF THE INVENTION

Accordingly, in one aspect there is provided a liner assembly for a pipeline section having at least one junction with a lateral pipe, the liner assembly comprising an outer tubular liner having an opening therein generally coinciding in position with each junction when the liner assembly is positioned with said pipeline section; and an inner malleable inflatable bladder assembly positioned longitudinally within said tubular liner, said bladder assembly being inhibited from over-expanding during positioning and inflation of the liner assembly within the pipeline section.

In one embodiment, each opening is a circumferential opening separating the tubular liner into segments. In another embodiment, each opening has a generally circular shape.

In one embodiment, the liner assembly further comprises a protective sheathing surrounding the liner. The protective sheathing is fitted to the outer surface of the tubular liner. In one form, the protective sheathing comprises a first longitudinal edge and a second longitudinal edge, the second longitudinal edge being adapted to overlap the first longitudinal edge, with the overlap being tack welded.

In one embodiment, the liner assembly further comprises a release layer positioned between the liner and the bladder.

In one embodiment, the inflatable bladder has a longitudinal over-expansion inhibiting element therein. The longitudinal over-expansion inhibiting element in one form is a longitudinally extending strap. The liner assembly may further comprise radial over-expansion inhibiting structure. In one form, the radial over-expansion inhibiting structure comprises sleeves adjacent opposite ends of the liner assembly.

In another aspect, there is provided a method of pipeline repair or reinforcement, said pipeline having at least one junction with a lateral pipe, the method comprising pulling a prepared liner assembly carrying a wetted liner into position in said pipeline, said liner assembly including an outer tubular liner, an inner malleable inflatable bladder positioned longitudinally within said tubular liner, and over-expansion inhibiting structure within the inner bladder and configured to restrict over-expansion of the liner assembly during positioning and inflation of the liner assembly within the pipeline, the tubular liner comprising an opening therein generally coinciding in position with each junction; introducing fluid into said malleable inflatable bladder so that said malleable inflatable bladder expands to bring said outer felt liner tube into firm contact with interior surface of the pipeline; maintaining said liner assembly in an inflated condition for a time period sufficient for the outer felt liner tube to cure; and deflating said malleable inflatable bladder and retrieving said malleable inflatable bladder from the liner assembly.

BRIEF DESCRIPTION OF THE DRAWINGS

Embodiments will now be described more fully with reference to the accompanying drawings in which.

DETAILED DESCRIPTION OF THE EMBODIMENTS

Figure 1:
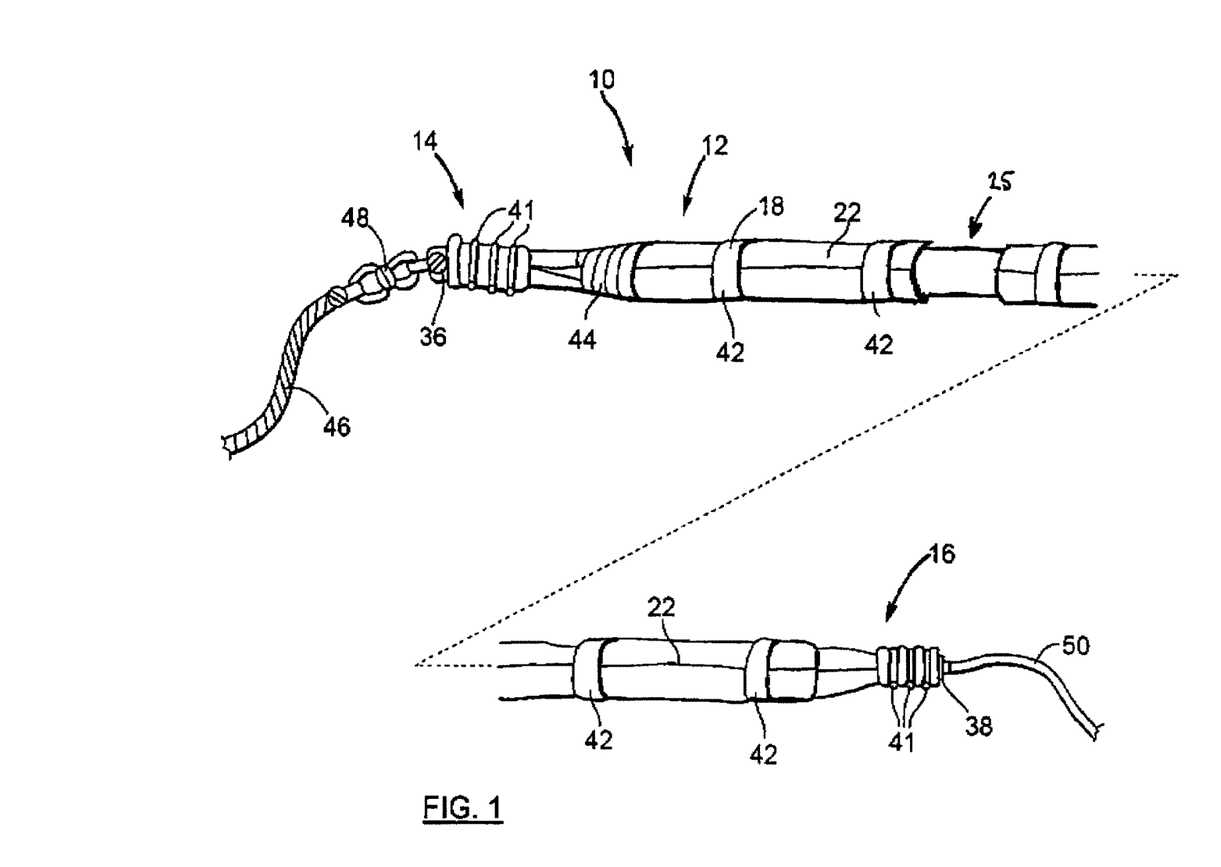
FIG. 1 is a side elevational view of a liner assembly for pipeline repair or reinforcement.

Turning now to FIG. 1, a liner assembly is shown and is generally identified by reference numeral 10. Liner assembly 10 includes a liner segment 12, which has an installation end 14 at one end thereof and an inflation end 16 at the opposite end thereof. To facilitate positioning of the liner assembly 10 in a pipeline, the installation end 14 is fitted with a pull block 36 that enables attachment of a suitable pull mechanism (i.e. a winch). The liner segment 12 is also fitted with an inflation block 38 at the inflation end 16, so as to allow the interior area of the liner segment 12 to be inflated. In the embodiment shown, the liner segment 12 is longitudinally folded over itself and bound at a plurality of spaced locations, in this example at twelve (12) to eighteen (18) inch intervals, using tape or other suitable binding material 18. The liner assembly 10 further comprises tapered sections 44 formed proximate the installation end 14 and the inflation end 16. The longitudinal folded liner segment 12 and the tapered sections 44 of the liner assembly 10 allow the liner assembly 10 to be manipulated and moved to a desired location within the pipeline. The liner assembly 10 also comprises one or more openings formed within the wall of the liner segment 12. Each opening is configured to coincide in position with a respective lateral pipe junction when the liner assembly 10 is installed in the pipeline, so as to prevent blockage of access to each lateral pipe as will be described. In the embodiment shown, liner segment 12 comprises a single opening 25 (see FIG. 6).

Figure 2:
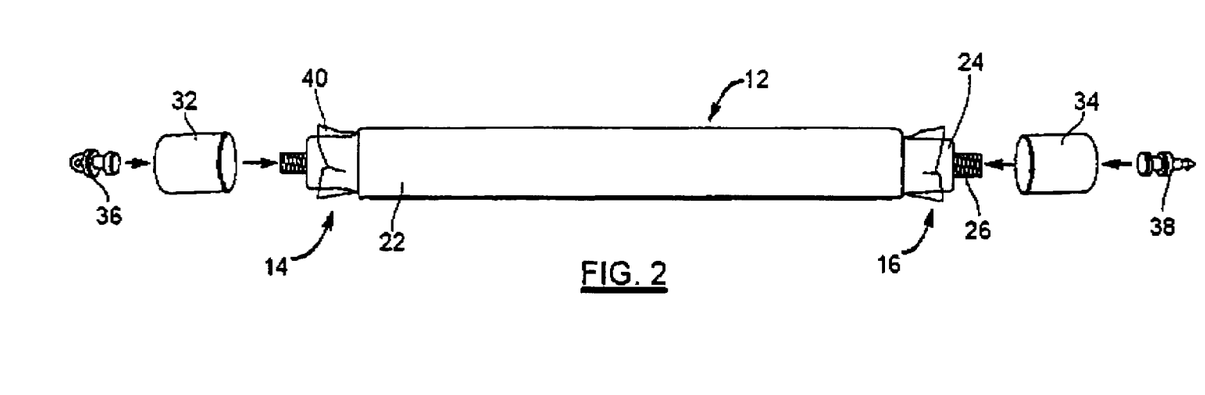
FIG. 2 is a partially exploded side elevational view of a liner segment forming part of the liner assembly of FIG. 1.
Figure 3:
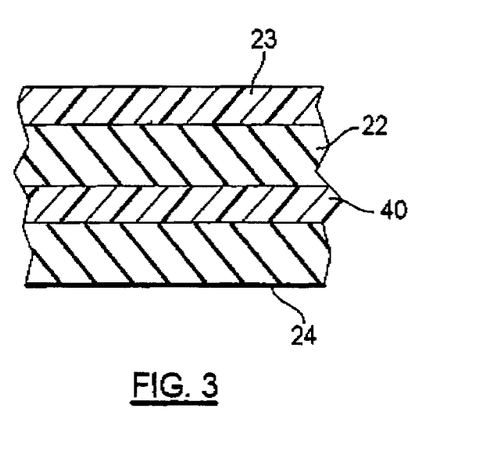
FIG. 3 is a cross-sectional view of a portion of the liner segment of FIG. 2.

FIGS. 2 and 3 better illustrate the liner segment 12. Liner segment 12 is generally provided in stock manufactured lengths, and is preferably provided on a roll, with desired lengths being cut from stock. The liner segment 12 is generally dimensioned to suit pipelines ranging from 1½ inches up to 6", but those of skill in the art will appreciate that the liner segment 12 may be dimensioned to accommodate smaller or larger pipeline diameters. As can be seen, liner segment 12 is multi-layered, and comprises a tubular liner 22, an elongate malleable inflatable bladder 24 extending longitudinally through the tubular liner, and a longitudinal over-expansion inhibiting element in the form of a non-stretchable strap 26 positioned within and extending along the length of the inflatable bladder 24. In this embodiment, the tubular liner 22 is fabricated of a felt material, the malleable inflatable bladder 24 is fabricated of rubber, and the non-stretchable strap 26 is fabricated of woven nylon. The liner segment 12 further comprises a plastic sheathing 23 over the outer surface of the tubular liner 22. In this embodiment, the plastic sheathing 23 has a first longitudinal edge that is configured to overlap a second longitudinal edge, and the overlap is tack welded for fitting the plastic sheathing 23 to the outer surface of the tubular liner 22. The liner segment 12 also comprises a release plastic 40 positioned between the tubular liner 22 and the malleable inflatable bladder 24. Non-stretchable retaining sleeves 32 and 34 are positioned adjacent opposite ends of the liner segment 12 to inhibit radial over-expansion of the liner assembly 10.

In use, to repair or reinforce a damaged section of pipeline, the required length of liner and the respective positions of one or more lateral pipe junctions along the pipeline are first determined. In this embodiment, a video camera connected to a video camera line is inserted into and moved along the interior of the pipeline. The camera line is marked at positions corresponding to the ends of the damaged section of pipeline to be repaired or reinforced, and at positions of the one or more lateral pipe junctions within the damaged section of pipeline to be repaired or reinforced. To ensure that the liner segment 12 adequately covers the interior area of the pipeline to be repaired or reinforced, and to allow the liner segment 12 to be trimmed as needed and to have the appropriate installation gear fitted thereto, an extra length portion is added to each end of the liner segment. In this embodiment, the extra length portion is approximately equal to 10" (250 mm). A liner segment 12 having an appropriate length is then cut from stock.

The cut liner segment 12 is then prepared in accordance with FIG. 2. Thus, during preparation, portions of the tubular liner 22 and the plastic sheathing 23 proximate the ends 14 and 16 of the liner segment 12 are removed by cutting so as to expose the underlying malleable inflatable bladder 24 and release plastic 40. For smaller diameter liners (up to 4"), about 6" of exposed inflatable bladder is sufficient. For larger diameter liners, about 9" of exposed inflatable bladder is sufficient. The tubular liner 22, plastic sheathing 23, malleable inflatable bladder 24 and release plastic 40 are then trimmed to expose a length (i.e. 4") of strap 26 at each of the ends 14 and 16.

Figure 4A:
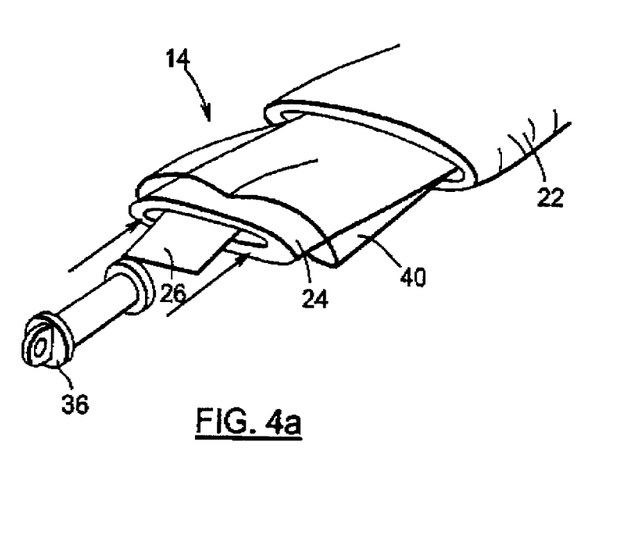
FIGS. 4a and 4b are perspective views showing installation of a pull block during assembly of the liner assembly of FIG. 1.
Figure 4B:
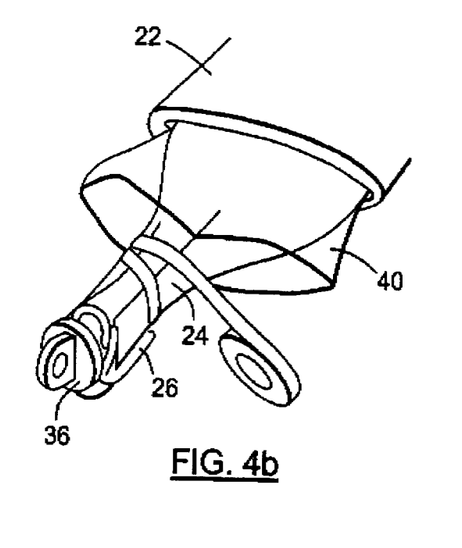

To prepare the trimmed liner segment 12 for installation, installation end 14 and inflation end 16 are sealed with suitable installation gear. As shown in FIG. 4a, at installation end 14, the pull block 36 is inserted into the inflatable bladder 24. The inflatable bladder 24 in the region surrounding the inserted pull block 36 is subsequently folded in or cinched (as shown in FIG. 4b) onto the pull block 36, ensuring a fit that is sufficiently tight for allowing inflation of the inflatable bladder 24 later in the procedure. During preparation of installation end 14, strap 26 is tightly incorporated either into the folds of the inflatable bladder 24, or into the taping used to securely maintain this arrangement at installation end 14, as shown in FIG. 4b. Inflation end 16 is similarly prepared (not shown), substituting inflation block 38 for the pull block 36 of the installation end 14. Similar to installation end 14, strap 26 is tightly incorporated into the folds or taping at inflation end 16.

One or more retaining sleeves 31 are then inserted between the release plastic 40 and the inflatable bladder 24. Each retaining sleeve 31 is positioned at a respective location along the length of the liner segment 12 that general corresponds with the position of a respective junction with a lateral pipe.

Figure 5A:
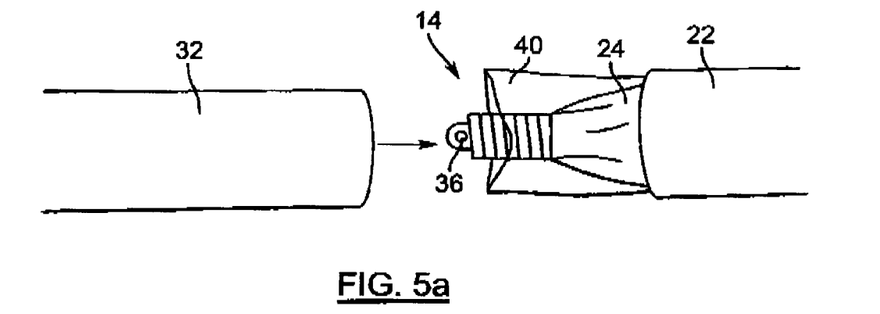
FIGS. 5a to 5c are side elevational views showing installation of a retaining sleeve during assembly of the liner assembly of FIG. 1.
Figure 5B:
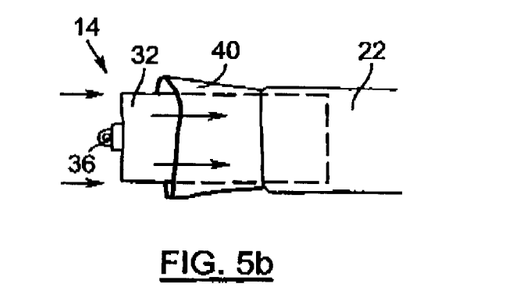
Figure 5C:
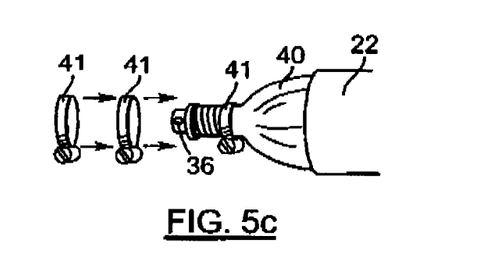

The ends 14, 16 of the liner assembly 10 are further prepared by inserting, between the release plastic 40 and the inflatable bladder 24, proximate each end 14, 16, the retaining sleeves 32, 34, as shown in FIG. 5a (only end 14 and retaining sleeve 32 are shown). Each retaining sleeve 32, 34 is cut to a length that starts at the front edge of the installation gear (i.e. pull block 36 or inflation block 38) and extends into the liner at least 6", as shown in FIG. 5b. As shown in FIG. 5c, at each end 14, 16, the retaining sleeve 32, 34 and release plastic 40 are folded in, over the taped ends previously prepared, and securely taped. Each end 14, 16 is then further secured using suitable clamps 41 to ensure a tight fit around the blocks positioned therein. In the embodiment shown, clamps 41 are gear clamps.

With the liner assembly 10 sealed at both ends 14, 16 with the appropriate installation gear, the outer tubular liner 22 is impregnated with an appropriate resin (i.e. epoxy). The process of impregnating the outer tubular liner 22 is commonly referred to as "wetting". In this embodiment, the outer tubular liner 22 is wetted by delivering resin to the space between the outer tubular liner 22 and the release plastic 40 at one of the ends 14, 16. Rollers (not shown) are then used to move the resin along the length of the tubular liner 22, as is well known in the art. To ensure complete wetting of the tubular liner 22, resin can be applied to both ends 14, 16.

After the tubular liner 22 has been wetted, the plastic sheathing 23 is scored to facilitate migration of the resin out of the tubular liner 22. Contact of the resin with the pipeline being repaired ensures that the liner being installed is fixed in place. The outside surface, of plastic sheathing is then wiped to ensure a clean dry surface. Turning again to FIG. 1, the liner assembly 10 is then longitudinally folded and taped at approximately 12" to 18" intervals 42 to retain this folded arrangement.

Figure 6:
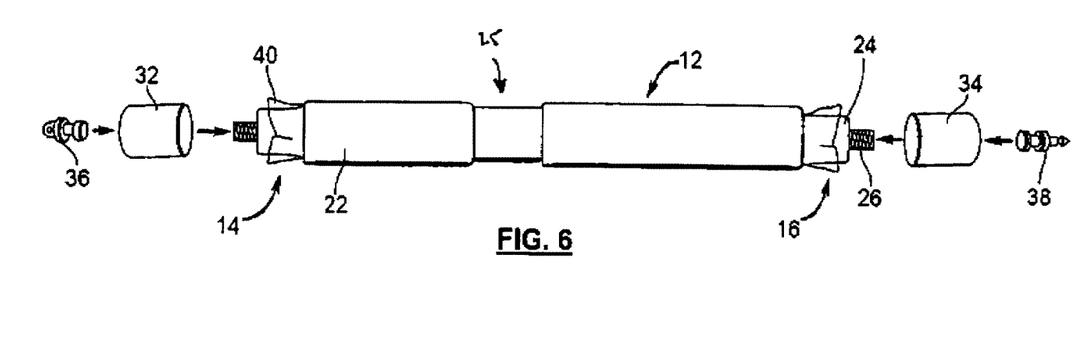
FIG. 6 is a partially exploded side elevational view of a liner segment similar to that of FIG. 2, but having an opening formed therein.
Figure 7:
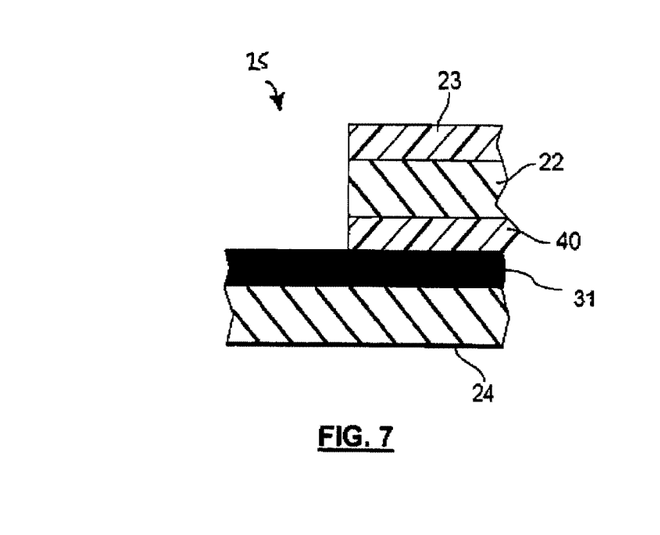
FIG. 7 is a cross-sectional view of a portion of the liner segment of FIG. 6.

Using the markings on the video camera line as a guide, the wetted, taped liner segment 12 is then cut at each of the measured positions of the junctions with lateral pipes so as to form an opening at each of the measured positions. Here, the plastic sheathing 23, the tubular liner 22 and the plastic liner 40 are cut together so as to define each opening 25, as shown in FIGS. 6 and 7. The positions of the one or more retaining sleeves 31 are then adjusted along the liner assembly 10, such that each retaining sleeve 31 spans the length of a respective opening 25. In the embodiment shown, the liner segment has been cut at a single position to form a single opening 25 that extends circumferentially around the liner segment 12. As will be understood, the circumferential opening 25 separates the tubular liner 22 into two separate, adjacent segments generally supported on the inflatable bladder 24.

To facilitate entry and/or movement of the liner assembly 10 in a pipeline, the leading edge of the tubular liner 22 is then taped to form a tapered configuration 44. In this embodiment, a silicone release gel is added to each end 14, 16 of the liner assembly 10 to facilitate the release of the inflatable bladder. A winch cable 46 is attached to pull block 36 at installation end 14. In this embodiment, devises 48 are used to attach winch cable 46 to the pull block 36. An air line 50 is attached to inflation block 38 of inflation end 16.

Figure 8A:
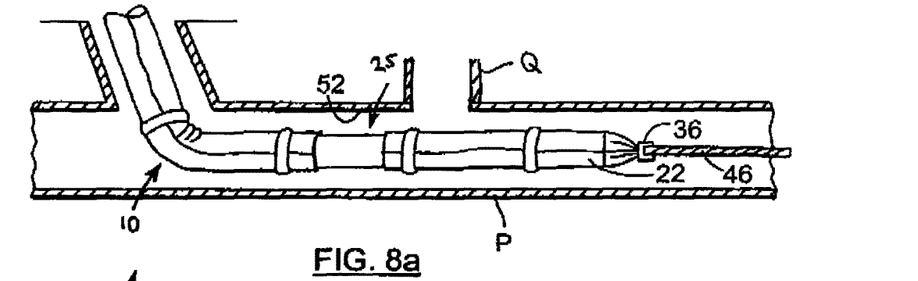
FIGS. 8a to 8c are side elevational views, partly in section, showing installation of the liner assembly of FIG. 1, comprising the liner segment of FIG. 6, into a pipeline to be repaired or reinforced.
Figure 8B:
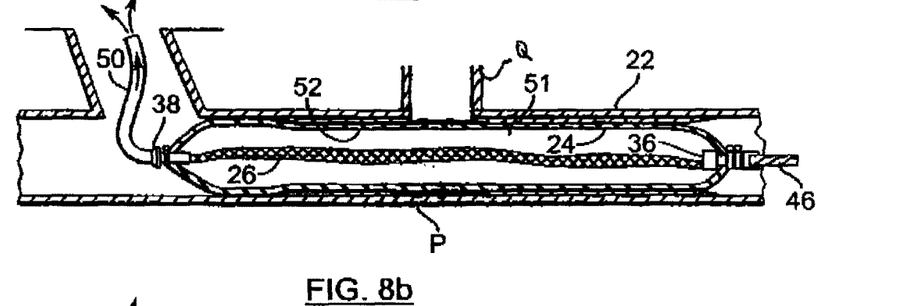

FIGS. 8a through 8c show installation of the liner assembly 10 in a section of pipeline P having a junction with a lateral pipe Q. During installation, the winch (not shown) is used to pull the liner assembly 10 into the pipeline P via winch cable 46, as shown in FIG. 8a. The liner assembly 10 is positioned within the pipeline section to be repaired or reinforced such that the one or more openings are aligned with the one or more lateral pipe junctions. In the embodiment shown, the positioning of the liner assembly 10 results in the single opening 25 being aligned with the single lateral pipe junction. Once the liner assembly 10 is at the desired position, an air pump (not shown) is operated to supply air through the air line 50 connected to inflation block 38. Air supplied through the air line 50 passes through inflation block 38 and enters internal reservoir 51 of the inflatable bladder 24. The inflatable bladder 24 is in turn inflated until the liner assembly 10 expands to the point where the tubular liner 22 firmly contacts the interior surface 52 of the pipeline, as shown in FIG. 8b. During inflation, the taped portions of the liner assembly 10 release, allowing the liner assembly, and surrounding plastic sheathing 23 to expand and contact the interior surface 52. Here, each retaining sleeve 31 generally prevents the inflatable bladder 24 from expanding into the respective lateral pipe Q. The liner assembly 10 is then maintained in this condition for a time period sufficient to enable the wetted outer felt tubular liner 22 to cure.

Figure 8C:
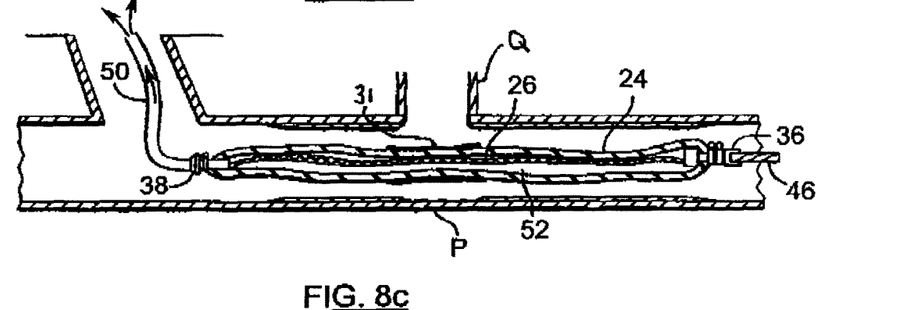

Following curing of the tubular liner 22, the air within the internal reservoir 51 is released through the inflation block 38 and air line 50 (see FIG. 8c). To facilitate this process, the air pump may be used to evacuate air from the internal reservoir 51, allowing the inflatable bladder 24 to resume its natural flat state. Once evacuated, the inflatable bladder is then withdrawn from the pipeline P via winch cable 46, leaving the cured tubular liner 22 in position within the pipeline.

The appropriate air pressure for inflating the inflatable bladder 24 depends on the diameter of the liner assembly. In general, liner assemblies having a diameter ranging from 3" to 6" are inflated to a pressure of about 12 to 15 pounds per square inch (psi). Liner assemblies of smaller diameter (i.e. 1½" and 2" liners) are inflated to a pressure of about 24 psi. During inflation, the air pressure should be sufficient to break the tape 18 spaced along the longitudinally folded liner assembly 10, allowing the liner assembly 10 to fill the pipeline section being repaired or reinforced.

Figure 9:
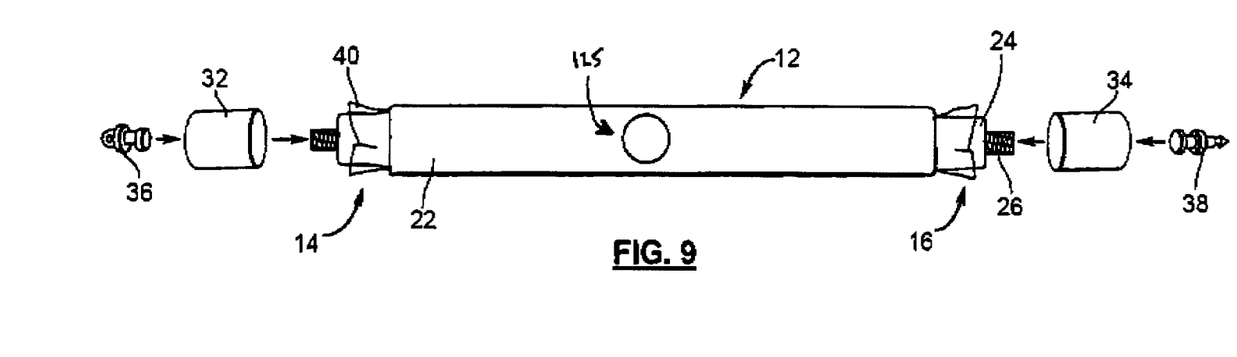
FIG. 9 is a partially exploded side elevational view of another liner segment similar to that of FIG. 2, but having an opening formed therein.

The shape of the opening formed in the liner segment is not limited to that described above and in other embodiments, other shapes of opening may be used. For example, FIG. 9 illustrates another embodiment of an opening formed within the wall of liner segment 12. In this embodiment, the liner segment comprises a single opening 125 that is generally circular in shape, and is sized to be generally commensurate with the internal diameter of lateral pipe Q. Similar to opening 25 described above, opening 125 is cut from the plastic sheathing 23, the tubular liner 22 and the plastic liner 40 of the liner segment 12. Those skilled in the art will understand that in still other embodiments, still other shapes of opening may alternatively be used.

Although the installation of the liner assembly has been shown with respect a linear section of pipeline, the liner assembly may also be used to install a liner in a bent section of pipeline. The ability of the liner assembly to adapt to bends (i.e. 22°, 45°, 90°) is provided by the malleable nature of the inflatable bladder 24 used in the liner assembly. As the liner assembly is inflated in a transitional area, the bladder not only stretches to accommodate the air pressure contained therein, but conforms to the bend so as to ensure the resin-impregnated liner is urged into contact with all surfaces of the transitional area. The inflatable bladder achieves this by allowing variable stretching, i.e. stretching less at the inside edge while stretching more at the outside edge of the bend. Prior art systems that used woven nylon or vinyl bladder systems could not achieve this variable stretching, ultimately resulting in creases and/or folds being formed in the resin-impregnated and resultant cured liner. The reduction and/or elimination of these creases results in greater fluid flow in the repaired section and well as a reduction in the likelihood of debris retainment and possible obstruction.

Although in the embodiments described above, the liner segment is cut at a single position to form a single opening, in other embodiments, the liner assembly may alternatively be cut at any number of positions to provide openings in the liner segment.

Although in the embodiments described above, the required length of liner and the respective positions of one or more lateral pipe junctions along the pipeline are determined by inserting and moving a video camera connected to a video camera line along the interior of the pipeline, in other embodiments, the required length of liner and the respective positions of one or more lateral pipe junctions along the pipeline may alternatively be determined using other methods.

Although in embodiments described above, during preparation of installation end, the strap is tightly incorporated into the folds of the inflatable bladder or the taping used to securely maintain this arrangement, in other embodiments, the strap may alternatively be firmly attached to the pull block, with the inflatable bladder being folded in or cinched in a similar manner as that described above.

Although in embodiments described above, the ends of the liner segment are sealed around the installation gear in two stages, namely by taping and by clamping, in other embodiments, each of the ends of the liner segment may alternatively be sealed around the installation gear in any manner so as to achieve substantially sealed ends.

Although in embodiments described above, silicone release gel is added to each end of the liner assembly to facilitate the release of the inflatable bladder, in other embodiments, no release gel may be used.

Although in embodiments described above, the liner segment comprises a release plastic positioned between the tubular liner and the malleable inflatable bladder, in other embodiments, such as for tubular liners having diameters less than 2", the release plastic may be omitted.

Although in embodiments described above, retaining sleeves are inserted between the release plastic and the inflatable bladder, in other embodiments in which a release plastic is not used, the retaining sleeves may alternatively be inserted between the tubular liner and the inflatable bladder.

Although in embodiments described above, the outer tubular liner is wetted by delivering resin to the space between the outer tubular liner and the release plastic, in other embodiments in which a release plastic is not used, the liner may alternatively be wetted by delivering resin to the space between the tubular liner and the inflatable bladder.

Although in embodiments described above, the tubular liner is fabricated of a felt material, in other embodiments, the tubular liner may alternatively be fabricated of another material.

Although in embodiments described above, the malleable inflatable bladder is fabricated of rubber, in other embodiments the malleable inflatable bladder may alternatively be fabricated of silicone. In still other embodiments, the malleable inflatable bladder may alternatively be fabricated of any suitable durable, malleable material.

Although in embodiments described above, the non-stretchable strap is fabricated of woven nylon, in other embodiments, the non-stretchable strap may alternatively be fabricated of woven vinyl. In still other embodiments, the non-stretchable strap may alternatively be fabricated of any suitable durable, non-stretchable material.

Although in embodiments described above, the retaining sleeves are fabricated of woven nylon, in other embodiments, the retaining sleeves may alternatively be fabricated of woven vinyl. In still other embodiments, the retaining sleeves may alternatively be fabricated of any suitable durable, non-stretchable material.

Although in embodiments described above a strap is employed to inhibit longitudinal over-expansion of the liner assembly and sleeves are employed to inhibit radial over-expansion of the liner assembly, those of skill in the art will appreciate that alternative structure or elements may be employed to achieve this functionality.

Although in embodiments described above, an air pump is operated to supply air through the air line connected to the inflation block for inflating the bladder with air, in other embodiments, another fluid pump may alternatively be operated to supply another fluid through the air line connected to the inflation block for inflating the bladder with the another fluid, where the another fluid may be any fluid such as, for example, any gas, any gas mixture, any liquid, any liquid mixture, or any mixture thereof.

Although preferred embodiments have been described, those of skill in the art will appreciate that variations and modifications may be made without departing from the scope thereof as defined by the appended claims.

What is claimed is:

1. A liner assembly for a pipeline section having at least one junction with a lateral pipe, the liner assembly comprising:
   an outer tubular liner having an opening therein generally coinciding in position with each junction when the liner assembly is positioned within said pipeline section;
   an inner malleable inflatable bladder positioned longitudinally within said tubular liner, said bladder being inhibited from over-expanding during positioning and inflation of the liner assembly within the pipeline section; and
   a retaining sleeve generally coinciding in position with each opening.

2. The liner assembly of claim 1, wherein each opening is a circumferential opening separating said tubular liner into segments.

3. The liner assembly of claim 1, wherein each opening has a generally circular shape.

4. The liner assembly of claim 1, further comprising a protective sheathing surrounding said liner.

5. The liner assembly of claim 4, wherein said protective sheathing is fitted to the outer surface of the tubular liner.

6. The liner assembly of claim 4, wherein said protective sheathing comprises a first longitudinal edge and a second longitudinal edge, said second longitudinal edge being adapted to overlap said first longitudinal edge.

7. The liner assembly of claim 6, Wherein the overlap is tack welded.

8. The liner assembly of claim 1, further comprising a release layer positioned between said liner and said bladder.

9. The liner assembly of claim 8, wherein each retaining sleeve extends between the release layer and the malleable inflatable bladder adjacent the respective opening.

10. The liner assembly of claim 1, wherein said inflatable bladder has a longitudinal over-expansion inhibiting element therein.

11. The liner assembly of claim 10, wherein said longitudinal over-expansion inhibiting element is a longitudinally extending strap.

12. The liner assembly of claim 10, farther comprising radial over-expansion inhibiting structure.

13. The liner assembly of claim 12, wherein said radial over-expansion inhibiting structure comprises sleeves adjacent opposite ends of said liner assembly.

14. The liner assembly of claim 1, wherein the pipeline has a plurality of junctions with lateral pipes, wherein the tubular liner comprises a plurality of openings each generally coinciding in position with a respective junction, and wherein the liner assembly comprises a plurality of retaining sleeves each generally coinciding in position with each opening.

15. The liner assembly of claim 1, wherein each retaining sleeve spans the length of the respective opening.

16. A method of pipeline repair or reinforcement, said pipeline having at least one junction with a lateral pipe, the method comprising:
   pulling a prepared liner assembly into position in said pipeline, said liner assembly including an outer wetted tubular liner having an opening therein generally coinciding in position with each junction when the proposed liner assembly has been pulled into position in said pipeline, an inner malleable inflatable bladder positioned longitudinally within said tabular liner, a retaining sleeve generally coinciding in position with each opening, and over-expansion inhibiting structure configured to restrict over-expansion of the liner assembly during positioning and inflation of the liner assembly within the pipeline;
   introducing fluid into said malleable inflatable bladder so that said malleable inflatable bladder expands to bring said outer wetted tubular liner into firm contact with an interior surface of the pipeline;
   maintaining said liner assembly in an inflated condition for a time period sufficient for the outer wetted tubular liner to cure; and
   deflating said malleable inflatable bladder and retrieving said malleable inflatable bladder from the pipeline.

17. The method of claim 16, further comprising, prior to said pulling, determining the position of each junction using a video camera connected to a video camera line positioned within an interior of the pipeline.

18. The method of claim 17, further comprising moving the video camera along the interior of the pipeline;
   marking the camera line at a position corresponding to the position of each junction; and
   cutting each opening usi arking on the video camera line as a guide.

19. The method of claim 16, wherein each opening is a circumferential opening separating said tubular liner into segments.

20. The method of claim 16, wherein each opening has a generally circular shape.

* * * * *

UNITED STATES PATENT AND TRADEMARK OFFICE
CERTIFICATE OF CORRECTION

PATENT NO. : 9,897,241 B2  
APPLICATION NO. : 14/398499  
DATED : February 20, 2018  
INVENTOR(S) : Manners Page 1 of 1

It is certified that error appears in the above-identified patent and that said Letters Patent is hereby corrected as shown below:

In the Claims

Claim 7, Column 9, Line 38, delete "Wherein" and insert --wherein--
Claim 12, Column 9, Line 51, delete "farther" and insert --further--
Claim 16, Column 10, Line 22, delete "tabular" and insert --tubular--
Claim 18, Column 10, Line 45, delete "usi arking" and insert --using the marking--

Signed and Sealed this
Sixteenth Day of July, 2019

Andrei Iancu
*Director of the United States Patent and Trademark Office*